United States Patent [19]
Gonzalez et al.

[11] Patent Number: 5,581,016
[45] Date of Patent: Dec. 3, 1996

[54] AIRCRAFT ENGINE DETONATION INDICATION SYSTEM

[75] Inventors: Cesar Gonzalez; James Cheek, both of Wichita, Kans.

[73] Assignee: The Cessna Aircraft Company, Wichita, Kans.

[21] Appl. No.: 346,822

[22] Filed: Nov. 29, 1994

[51] Int. Cl.⁶ .................................................. G01L 23/22
[52] U.S. Cl. ...................................... 73/35.06; 73/35.13
[58] Field of Search ................... 73/35, 35.06, 35.11, 73/35.13, 35.03; 374/142, 143

[56] References Cited

U.S. PATENT DOCUMENTS

| | | | |
|---|---|---|---|
| 4,002,155 | 1/1977 | Harned et al. | 73/35 |
| 4,163,385 | 8/1979 | Kato et al. | 73/35 |
| 4,577,510 | 3/1986 | Bur et al. | 374/143 |
| 4,750,103 | 6/1988 | Abo et al. | 73/35 |
| 4,984,905 | 1/1991 | Amano et al. | 374/143 |

*Primary Examiner*—John E. Chapman
*Attorney, Agent, or Firm*—Edward L. Brown, Jr.

[57] ABSTRACT

A detonation detection system for internal combustion piston engines which senses pressure within each cylinder through a piezoelectric force transducers installed under each spark plug producing pressure charged signals which signal is converted from inline charge to voltage. The signal is then passed through a gating comparator which segregates out the low pressure signals associated with intake and exhaust strokes. The signal then passes through a high-pass filter which removes normal combustion pressures. The filtered signal is then processed through an RMS (root mean square) to a DC converter which continuously computes the instantaneous square of the input signal, averages it, and takes the square root of the result to provide a DC voltage proportional to the RMS of the input. The DC signal is then processed through a peak and hold circuit which holds the peak signal for an adjustable reset-time period. A digital display is provided for each cylinder which receives and displays in numerical value the peak RMS signal.

5 Claims, 5 Drawing Sheets

AIRCRAFT ENGINE DETONATION INDICATION SYSTEM

BACKGROUND OF THE INVENTION

This invention relates generally to a detonation indication system, and more specifically to an onboard aircraft engine detonation indication system, which senses detonation through the use of combustion pressure sensing force transducers located under the spark plugs of each cylinder.

The threat of imposing unleaded aviation gasoline regulations is causing great concern in the aviation industry, since most of the larger displacement piston engines of the existing fleet require 100 octane fuel. There is no economically acceptable alternate method of producing 100 octane fuel in the absence of tetra ethyl lead. The proposed changes in fuels will force a reduction of the octane levels which will greatly affect the performance of these large piston aircraft engines in their present configurations. The power to weight performance of the aircraft is, of course, crucial and the engines must operate at their peak performance levels with these anticipated octane reduction changes. The key means to restore power losses is the development of appropriate engine modifications and/or tuning changes. However, a tradeoff in developing engine modifications and tuning changes is the risk of detonation (knock) which can be destructive to an engine.

It is anticipated that the lesser octane unleaded fuels of the future may require recertification of a significant number of aircraft with potential revisions as to lifting capacity, load and engine performance, depending on the combined impact of fuel knock characteristics and engine modifications or tuning changes adopted. The present system was designed to perform ground and flight evaluations of new candidate unleaded aviation gasolines, and to facilitate the extensive recertification effort that lies ahead. Current methods of monitoring knock lack the precision required to evaluate new fuels, and place difficult monitoring and management demands on test pilots in the air. A detonation indication system with simplified management characteristics is needed, which can be quickly read without adjustments to determine engine knock for each cylinder of each engine. The instrument needs to detect not only intensity of the knock events but provide an indication of events frequency as well.

One of the first aircraft engine analyzers was the Sperry system which is set forth in U.S. Pat. No. 2,518,427. The Sperry system which incorporates an oscilloscope display, analyzed various other malfunctions, besides detonation such as defective valve train components, spark plugs, magnetos, incorrect ignition timing, mixture and various other engine irregularities. The Sperry system has been accepted as the standard by the regulatory agencies in the certification of aircraft. However, it is large, cumbersome and requires a substantial amount of accessory equipment which renders it difficult to use in flight for general aviation aircraft, and non-usable on the smaller members of this fleet.

The Sperry system also requires substantial adjustment before it can be used, along with a technician to perform functional mode selections, and to view and adjust the oscilloscope which certainly could not be safely done by the test pilot alone.

The AVCO Detonation Analyzer System was developed in more recent times. However, it also sensed vibration as in the Sperry system and presented the data on the screen of an oscilloscope. The AVCO system required a vibration pickup mounted on each cylinder and an engine mounted crankshaft encoder for referencing TDC (top dead center of each cylinder). The AVCO system demands a skilled operator to perform adjustments and considerable time of engine operation under knock conditions in the air, since the interpretation criteria is based on a count of knock events (light flashes) per minute.

Other modern engine sensors in the non-aviation field have been developed for various automotive applications. U.S. Pat. No. 4,450,811 belonging to the NGK Spark Plug Co., Ltd. is an example. The NGK controller is not a system to analyze the performance of an engine but rather a system for operating a fuel injected automotive engine which controlled the ignition timing and mixture to operate the fuel system of the vehicle. This system senses pressure in the cylinders through the use of piezoelectric washers on the head bolts. The NGK system requires measuring the crank angle (crankshaft encoder), which the present invention does not and its purpose is somewhat different in that when it senses knock, it automatically retards the timing.

Similar piezoelectric washers, as disclosed in the NGK patent above, have been used under spark plugs to sense knock in some Nissan automobiles for the same purpose as in the NGK system.

There are automotive engine analyzers on the market today such as the AVL Indiskop and Norland systems which are stationary units used in laboratories for engine development and diagnostic purposes. These systems provide a visual indication of knock conditions by means of cylinder pressure traces displayed on a screen, along with numerous other engine parameters not embodied in this invention.

SUMMARY OF THE INVENTION

The present invention precisely detects detonation, and provides a measure of detonation intensity and minimum knock event frequencies in an aircraft internal combustion piston engine in flight. The detection system senses normal and abnormal combustion characteristics through piezoelectric force transducers installed under one spark plug in each cylinder, and renders a digital display which identifies isolated and repetitive detonation events in each cylinder. The pressure induced signal is converted from an inline charge to voltage. The voltage signal is then passed through a comparator gating means which segregates out the low pressure signals associated with intake and exhaust strokes that normally include severe vibratory components from the operation of the valve system. The comparator gating eliminates the need for shaft encoders which are required in the above-mentioned prior art systems. The signal then passes through a high-pass filter which removes the normal compression and expansion cycle pressure signals and enhances the discrimination between normal and detonation combustion events. The filtered signal is then processed through an RMS (root mean square) to a DC converter which continuously computes the instantaneous square of the input signal, averages it, and takes the square root of the result to provide a DC voltage proportional to the RMS of the input. The DC signal is then processed through a peak and hold circuit which holds the peak signal for an adjustable reset-time period ranging between two and six seconds. Lastly, a digital display is provided for each cylinder which receives and displays a numerical value of the peak RMS signal.

It is the principal object of the present invention to provide an onboard detonation indication system for aircraft piston engines which detects and measures detonation in each cylinder with a numerical digital display.

Another object of the present invention is to provide a detonation indication system without sensing crank angle timing or encoder functions.

A further object of the present invention is to provide a highly sensitive detonation detection and indication system for each cylinder which measures both minimum frequency of detonation events and their intensities.

DESCRIPTION OF THE PREFERRED EMBODIMENTS

Figure 1:
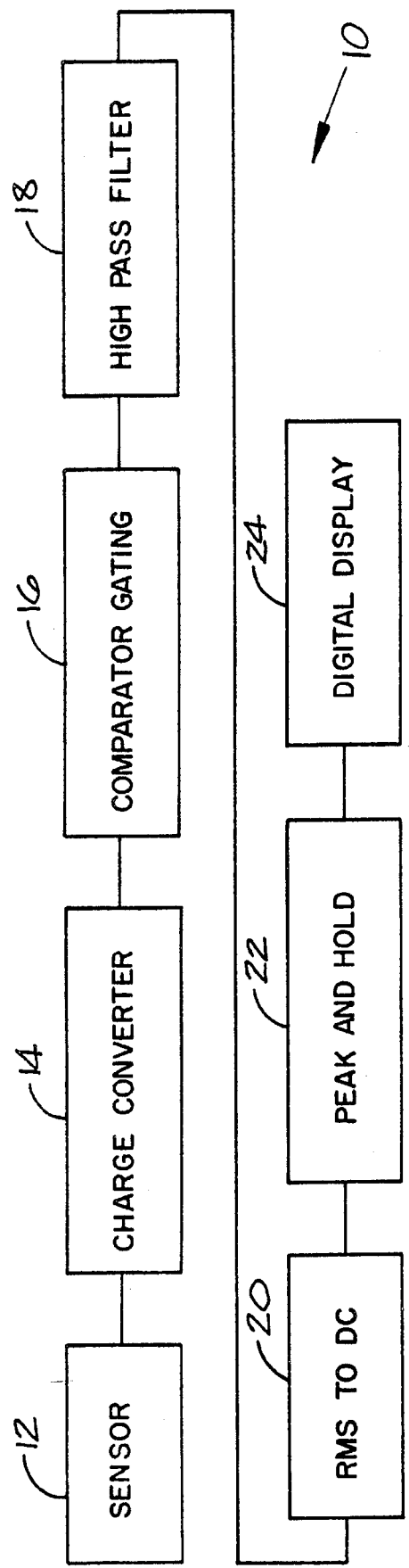
FIG. 1 is a block diagram of the various components of the detonation indication system of the present invention.
Figure 5:
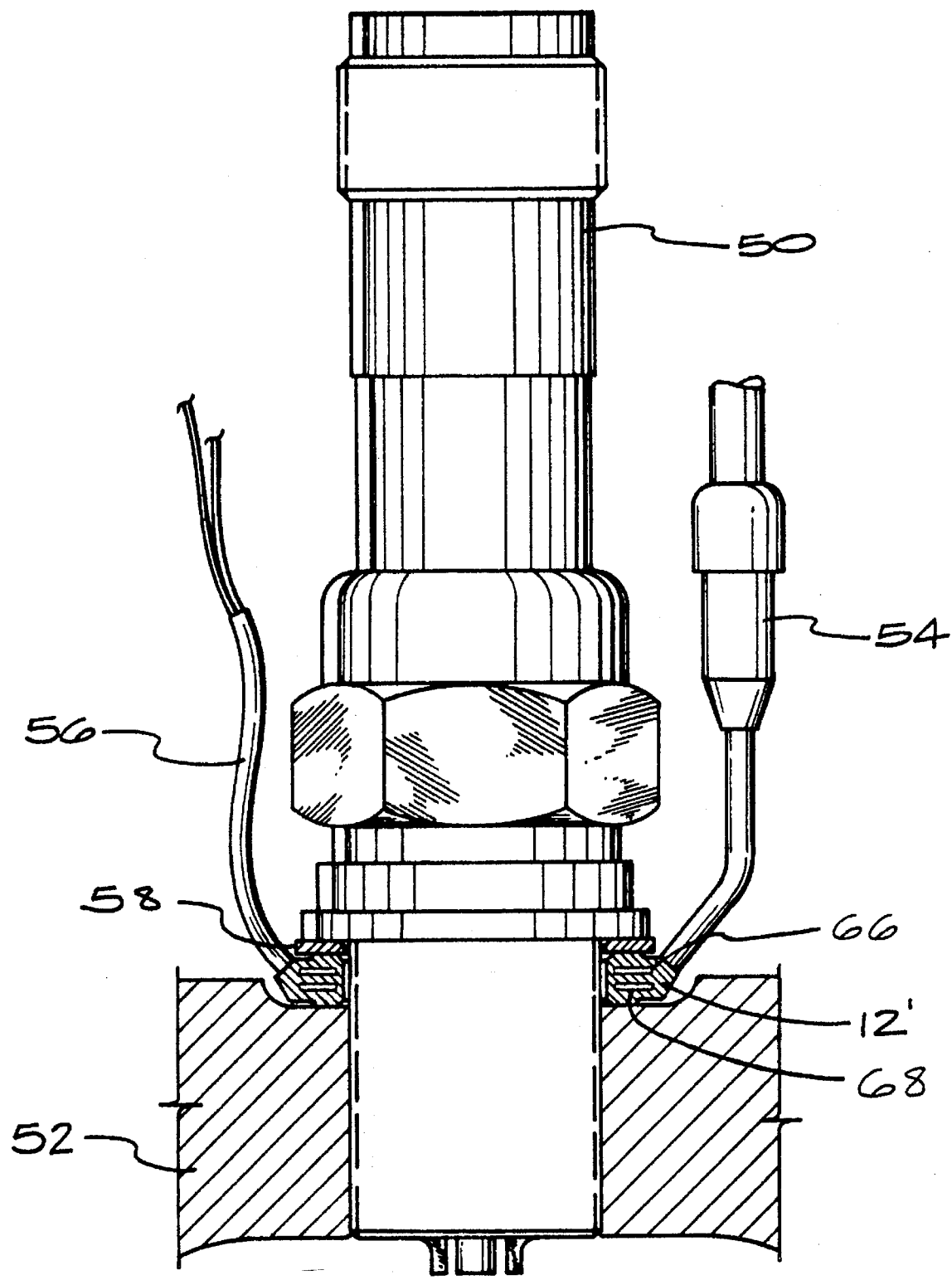
FIG. 5 is a partially sectional view to an enlarged scale of a modified form of sensor washer positioned under an aircraft spark plug.

The invention is an onboard aircraft engine detonation indication system that is generally identified by reference numeral 10. In FIG. 1 the system is shown in block diagram form for a single cylinder. Sensor 12, not shown in detail, is a quartz piezoelectric force transducer washer similar to those known in the automotive market and an example of which is shown in the above-mentioned NGK patent. The pressure sensors 12, shaped like washers with a wire connector and lead, are mounted under the spark plugs of each cylinder and torqued in place. An example of this is shown in FIG. 5 with modified sensor 12', which will be described hereafter. The force transmitted through the spark plugs to the sensors 12 during the combustion stroke in each cylinder, generate an electrical charge signal with a time trace similar to that shown in FIG. 2(a) and FIG. 3(a).

Figure 2:
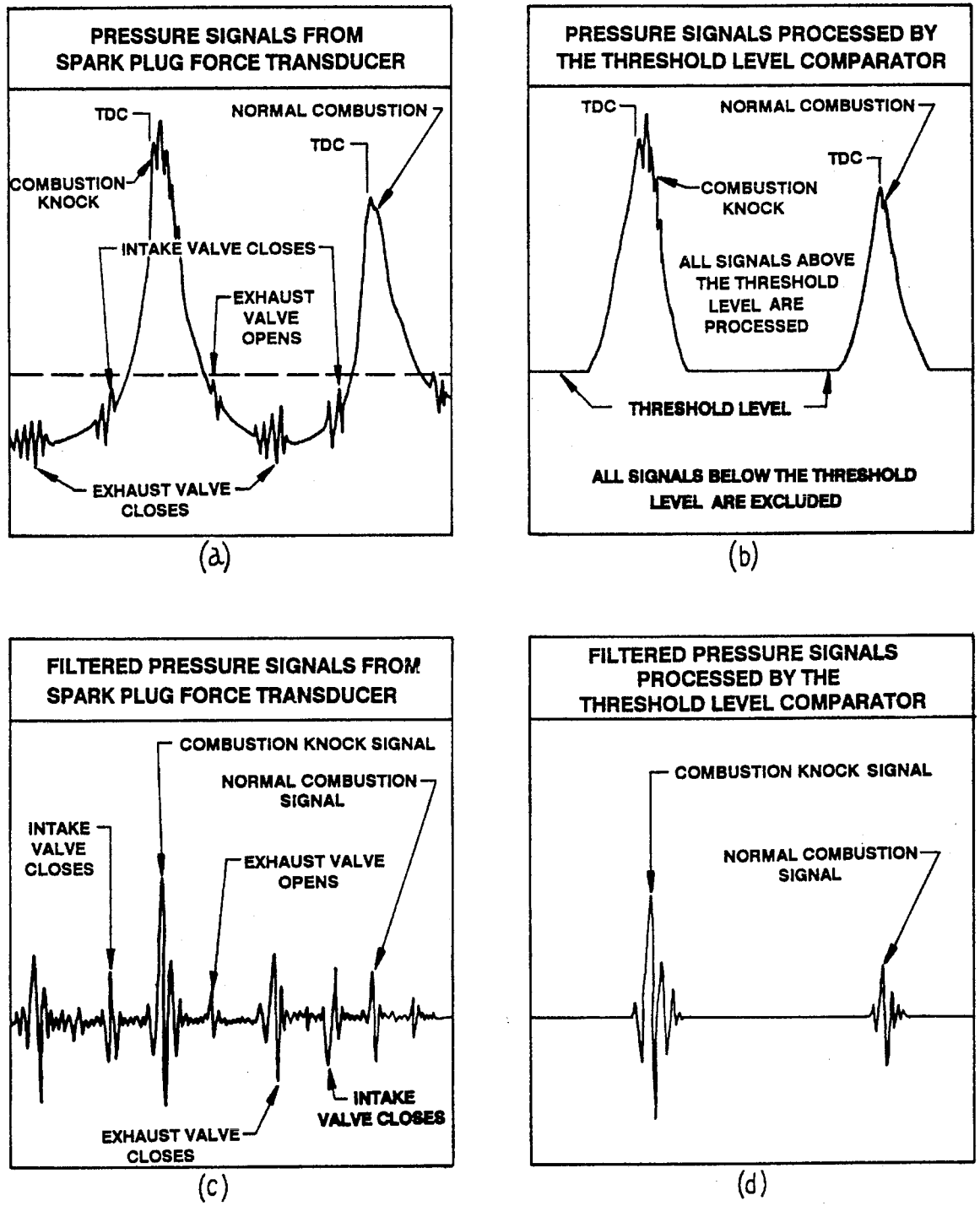
FIG. 2 includes time traces illustrating wave forms of various raw, filtered and gated signals in the circuits of the system.
Figure 3:
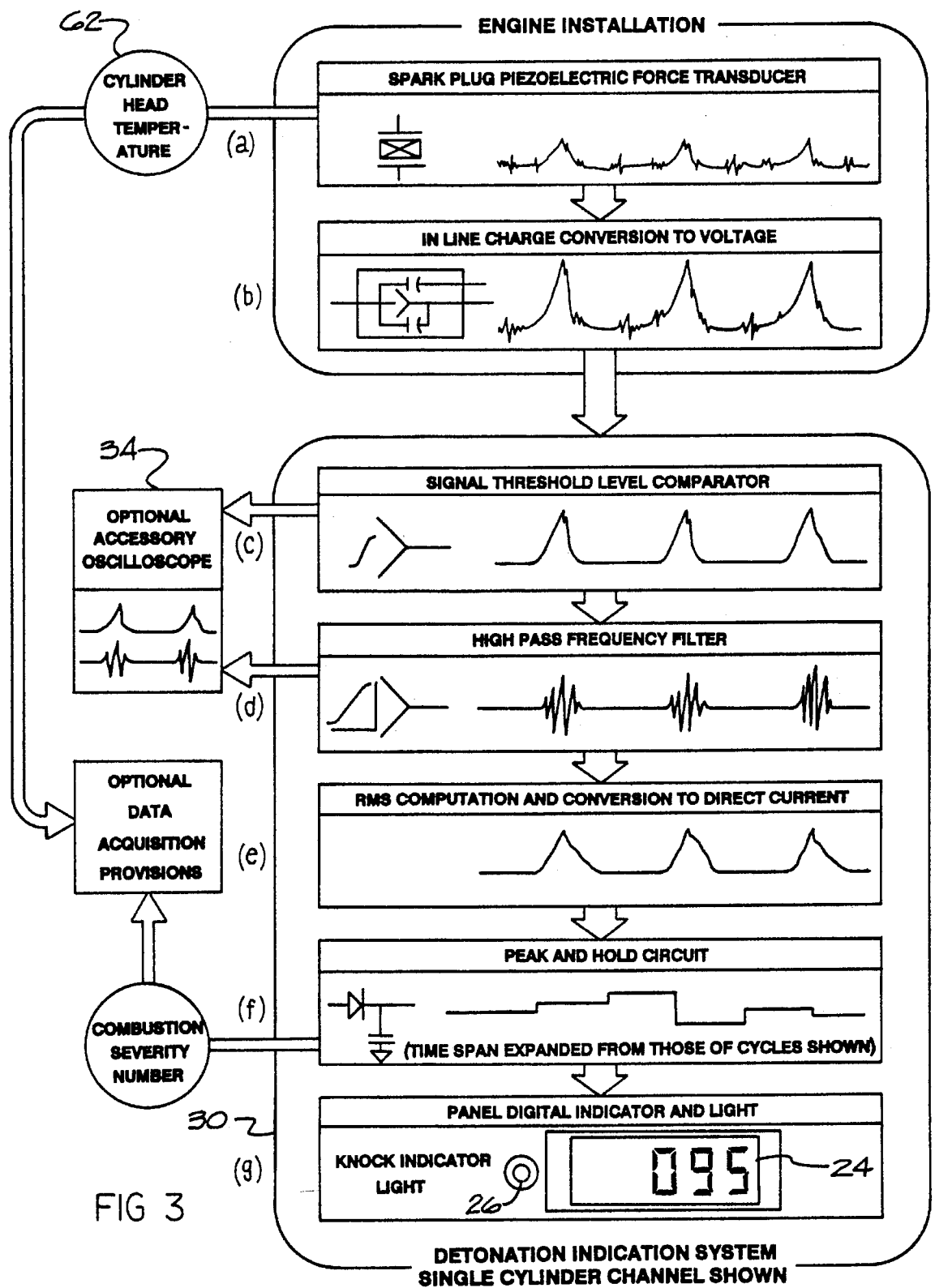
FIG. 3 also depicts time traces illustrating the signal wave form changes of various components of the system.
Figure 4:
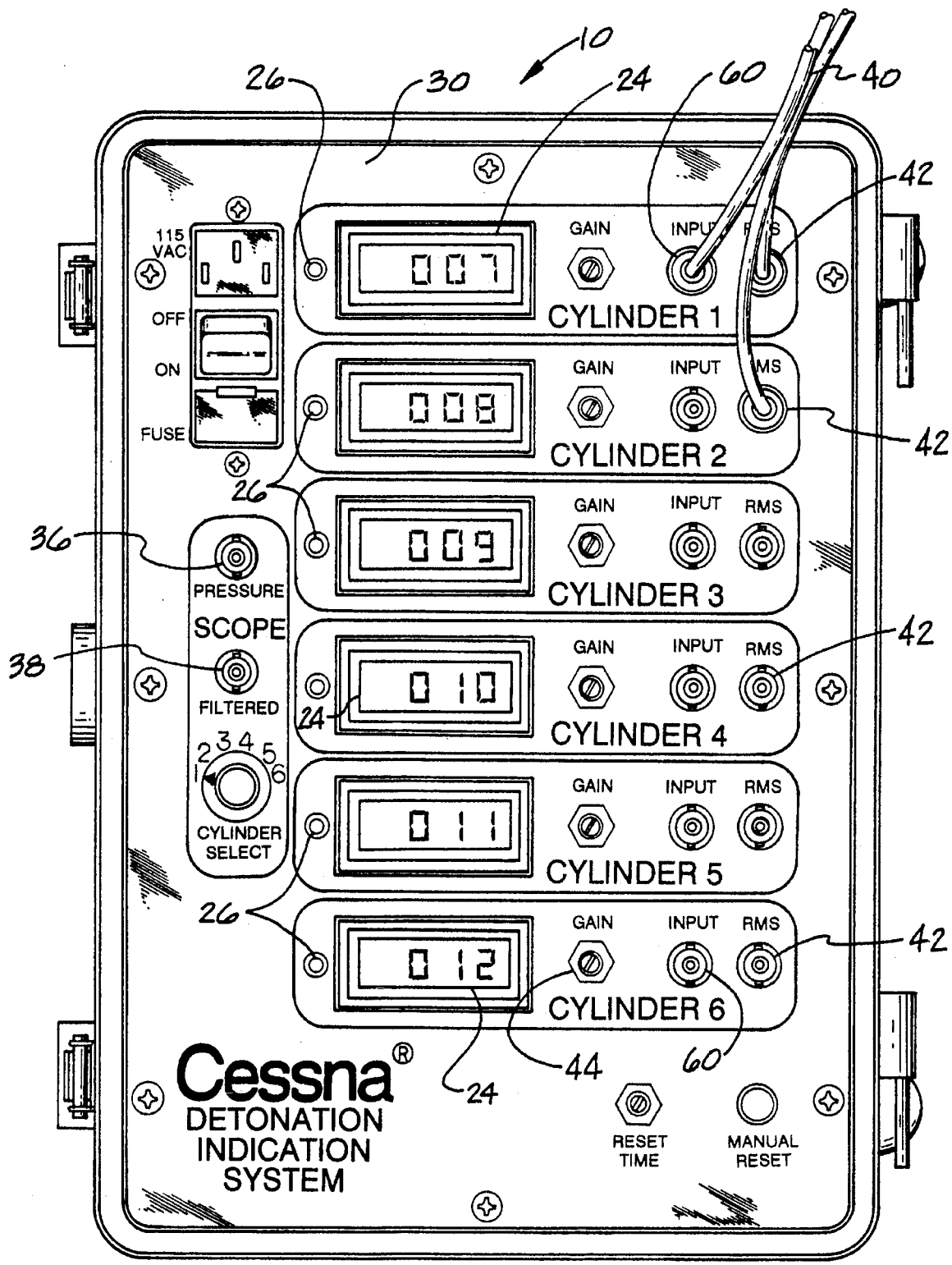
FIG. 4 is a front elevational view of the control panel of the onboard aircraft detonation indication system.

Located in the engine compartment in close proximity to each sensor 12 is an inline charge converter 14 which converts the signal charge to voltage as illustrated by the time trace in FIG. 3(b). In FIG. 2(a) a raw time trace is illustrated showing a normal combustion event on the right and a detonation combustion event on the left. With detonation, a series of high-frequency spikes develop commencing near top dead center, as graphically shown on the left. FIG. 2(a) also illustrates a variety of vibratory components associated with the opening and closing of the intake and exhaust valves which take place at low combustion chamber pressures, all of which are of no concern to the detection and intensity assessment of detonation. The raw voltage signals shown in FIG. 2(a) are gated at a threshold level as indicated in FIG. 2(b) wherein all signals below the threshold level are excluded by the comparator gating means 16. The gated signal is then passed through a high-pass filter 18 to remove the low cycle pressures which leaves a signal with a time trace as illustrated in FIG. 2(d). In the absence of the comparator gating means 16, the high-pass filter 18 would emit a signal as shown in FIG. 2(c). This signal, with all of the extraneous other signal spikes would obviously overshadow the pressure signals derived strictly from normal or detonation combustion processes. In the prior art this problem was dealt with through the use of a shaft encoder which looked at the signal only during a portion of the compression and combustion stroke. With the comparator gating means 16 this is not necessary, and the overall indication system becomes simpler to install and more reliable in operation. The RMS of the signal emitted from the high-pass frequency filter as illustrated in FIGS. 2(d) and 3(d) are converted to a DC voltage by circuit 20 as illustrated by the time trace in FIG. 3(e). The peak and hold circuit 22 takes the signal from a circuit 20, while searching and holding the maximum signal for a variable reset time period which can be adjusted approximately between two and six seconds as indicated by the time trace in FIG. 3(f). The digital display 24 translates the peak and hold signal to a digital reading, as seen in FIGS. 4 and 3. The display has an adjustable reference point that indicates the transition from normal combustion to knocking, and the light 26 in FIGS. 3 and 4 flashes for each reset time period that experiences at least one detonation event. For example the reference detonation point could be set at a digital display level of 100 and over.

FIG. 4 illustrates the control panel 30 of the detonation indication unit without the pressure sensors 12 or the charge converters 14, both of which are located on the engine while the indication unit 30 is positioned in the cockpit adjacent the pilot or observer.

Due to the simplified digital read out of each cylinder and its flashing light, the pilot of the aircraft can utilize the detection system 10 while changing the operating conditions of the engine in flight. Various factors bring on detonation or knock including reduction in fuel octane ratings, ignition timing changes, induction air manifold pressure, induction air temperatures and RPM.

While the control panel 30 will indicate each reset period with at least one detonation event for each cylinder, it is sometimes desirable to have the option of utilizing an oscilloscope to view the raw and filtered signal traces for a particular cylinder. To achieve this, an oscilloscope 34 shown symbolically in FIG. 3(c) can be connected to the control panel terminals 36 and 38 in FIG. 4. The system for each cylinder includes a gain adjustment 44, which after being initially set generally requires no further adjustment. FIG. 4 only illustrates three electrical leads 40 connected to the control panel 30; however, when in use, the other leads would be in place depending upon the number of cylinders per engine. The RMS ports 42, in FIG. 4, may be connected to a data acquisition means 46 symbolically shown in FIG. 3(f), to record combustion intensity digital indications 24, concurrently with other engine and flight test data, and to automatically activate the data acquisition means at the onset of detonation.

FIG. 5 illustrates a modified form of sensor washer 12' symbolically shown positioned under spark plug 50 in an aircraft cylinder head 52. On top of the sensor 12' is a conventional steel washer 58 which exerts a compressive load on sensor 12' when the plug 50 is torqued in place. Located within sensor 12' are two different sensors, 68 and 66. Sensor 68 is a piezoelectric force transducer as previously described and sensor 66 is a conventional thermocouple for sensing cylinder head temperature, both of which are contained within a common sheath. Exiting sensor 12' on the right side is the piezoelectric lead 54 and on the left side thermocouple lead 56. Lead 54 connects to input terminal 60 shown in FIG. 4 while lead 56 connects to CHT indicator 62 shown in FIG. 3(a). In typical aircraft detonation-testing, cylinder head temperatures are recorded by separate sensors on each cylinder head.

With the optional data acquisition means 46 in use, there is no calculation and recording of data until the initial detonation event, at which time it begins to record data automatically including number of events, combustion severity and additional data such as CHT if desired. Means 46 can also be activated manually.

The system 10 is basically free of adjustments and merely requires positioning the pressure sensing transducers 12 under each of the cylinders spark plugs and to connect the leads 40 to the control panel 30. The pressure sensitive washers 12 not only indicate the onset of detonation but they also measure the intensity of the detonation in the digital display 24. The system 10 is very accurate and can measure the onset of detonation within 0.1 inches of induction air manifold pressure. One of the intended uses of the system 10 is with a fuel system which blends two different octane fuels during flight to adjust the octane rating of the blended fuel stream supplying the engine.

We claim:

1. A detonation indication system for internal combustion piston engines which senses pressure within the cylinder comprising:
   a piezoelectric force transducer installed under a spark plug of each cylinder to produce an on-going pressure charge signal;
   inline charge to a voltage conversion means for convening the charge signal from each transducer into a voltage signal;
   comparator gating means which separates out low pressure signal components associated with intake and exhaust strokes in the absence of a crankshaft encoder;
   high-pass frequency/filter means to remove from the voltage signal components associated with low frequency changes in normal cycle pressure signals;
   RMS to direct current converter means which continuously computes the instantaneous square of the input signal from the high frequency filter, averages it, and takes the square root of the results to provide a DC voltage proportional to the RMS of the input;
   peak and hold circuitry means which selects and holds the peak RMS signal for an adjustable time period; and
   digital display means for each cylinder which receives a signal corresponding to the peak values and provides a display indicative of detonation events.

2. A detonation indication system as set forth in claim 1, wherein the force transducer means is of a quartz type.

3. A detonation indication system for internal combustion piston engines which senses pressure within the cylinder comprising:
   a force transducer associated with each cylinder to produce an ongoing pressure charge signal;
   inline charge to a voltage conversion means for convening the charge signal from each transducer into a voltage signal;
   comparator gating means to remove from the voltage signal low pressure signal components associated with intake and exhaust strokes in the absence of a crankshaft encoder;
   high-pass frequency/filter means to remove from the voltage signal components associated with low frequency changes in normal cycle pressure signals;
   RMS to direct current converter means which continuously computes the instantaneous square of the input signal from the high frequency filter, averages it, takes the square root of the results to provide a DC voltage proportional to the RMS of the input;
   peak and hold circuitry means which selects and holds the peak RMS signal for an adjustable time period; and
   digital display means for each cylinder which receives a signal corresponding to the peak values and provides a display indicative of detonation events.

4. A detonation indication system as set forth in claim 3, wherein the force transducer means is of a quartz type.

5. A detonation indication system as set forth in claim 3, including an indicator light means which has an adjustable reference point which indicates the transition from normal combustion to knocking.

\* \* \* \* \*